US011683537B2

(12) United States Patent
Shinde et al.

(10) Patent No.: US 11,683,537 B2
(45) Date of Patent: Jun. 20, 2023

(54) ARTIFICIAL INTELLIGENCE BASED PERCEPTUAL VIDEO QUALITY ASSESSMENT SYSTEM

(71) Applicant: MODAVITI EMARKETING PVT LTD, Maharashtra (IN)

(72) Inventors: Manoj Shinde, Mumbai (IN); Danish Jamil, Mumbai (IN); Abhit Sinha, Greater Noida west (IN)

( * ) Notice: Subject to any disclaimer, the term of this patent is extended or adjusted under 35 U.S.C. 154(b) by 101 days.

(21) Appl. No.: 17/156,588

(22) Filed: Jan. 24, 2021

(65) Prior Publication Data

US 2021/0233224 A1 Jul. 29, 2021

(30) Foreign Application Priority Data

Jan. 23, 2020 (IN) .............................. 202021003088

(51) Int. Cl.
| | |
|---|---|
| H04N 21/234 | (2011.01) |
| G06N 3/04 | (2023.01) |
| G06N 3/08 | (2023.01) |
| G06T 7/00 | (2017.01) |
| G06V 20/40 | (2022.01) |
| G06F 18/214 | (2023.01) |

(52) U.S. Cl.
CPC ..... *H04N 21/23418* (2013.01); *G06F 18/214* (2023.01); *G06N 3/04* (2013.01); *G06N 3/08* (2013.01); *G06T 7/0002* (2013.01); *G06V 20/41* (2022.01); *G06T 2207/10016* (2013.01); *G06T 2207/20081* (2013.01); *G06T 2207/20084* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 2012/0155765 A1* | 6/2012 | Joshi .................... | G06V 10/993 382/172 |
| 2016/0021376 A1* | 1/2016 | Andreopoulos ...... | G06T 7/0002 348/181 |
| 2016/0335754 A1* | 11/2016 | Aaron ................ | H04N 21/4666 |
| 2017/0295374 A1* | 10/2017 | Aaron ................. | H04N 19/154 |
| 2018/0167620 A1* | 6/2018 | Li ........................ | H04N 19/593 |
| 2020/0380290 A1* | 12/2020 | Sodhani ................ | G06N 20/00 |

* cited by examiner

*Primary Examiner* — Leon Flores
(74) *Attorney, Agent, or Firm* — Patshegen IP; Moshe Pinchas

(57) ABSTRACT

A video quality evaluation system comprises a training module, a calculation module, an analytical module, a designing module, an optimization module, and an estimation module. The training module collects training videos and trains labels of perceptual quality generation that is associated with the collected videos. The calculation module determines objective metrics based on the trained labels that are associated with the collected videos. The analytical module analyses scenes of the training video, and correlates objective metrics associated with the analysed scenes using perceptual parameters. The designing module designs a Convolutional Neural Network (CNN) Architecture based on data associated with the objective metrics and trains a model generated based on the designed CNN architecture. The optimization module optimizes the model and optimizes power after the model optimization. The estimation module estimates perceptual quality scores for incoming video data after the power optimization.

10 Claims, 3 Drawing Sheets

ARTIFICIAL INTELLIGENCE BASED PERCEPTUAL VIDEO QUALITY ASSESSMENT SYSTEM

FIELD OF THE INVENTION

The present invention relates to an artificial intelligence (AI) based perceptual video quality assessment system. More particularly, the present invention relates to a perceptual video quality assessment system that provides a real time feedback that informs a service provider regarding the perceptual quality of the video rendered on the devices of the end user, which eventually leads to an accurate evaluation of the real time video quality experience by the end user.

BACKGROUND OF THE INVENTION

Video broadcasting is a currently one of the main means of communication which demands a high level of research in terms of data transfer, bit rate speed, video clarity, etc. There are different modes or use cases where video broadcasting is being utilized, namely, Video broadcasting system (Multicast), OTT Platforms-(Unicast), Telecom (5G), Security and Surveillance, Game streaming, etc. In the case of Multicast method network providers can get the real time feedback on the perceptual quality of the video. The network providers also fail to evaluate the quality of the video experience by the end users, which could be used for creating the feedback system for the network providers and the content providers. The video calling/video conferencing solution providers or the Unicast is a process of point-to-point streaming, and therefore wherever the video feed is generated, it can be demanded by a single point user and is provided to that endpoint unswervingly. However, currently the unicast system cannot retrieve the real time feedback on the perceptual quality of the video.

Similarly, telecom (5G) Network providers are also not able to evaluate the video quality at their local data centres (MEC). There is a need for security and surveillance systems require to evaluate the video quality of the CCTV footage in real time, and game streaming systems also need a metrics to calculate the video image quality during the rendering of the game on screen in real time, which also directly affects the gaming quality as well. In view of the above use cases, the current video quality systems follow the methods, such as network parameter in the case of multicast and unicast, subjective evaluation, statistical evaluation, and artificial neural network evaluation. The Network Parameter involves identification of the network congestion, packet loss, bit rate drop, etc., but cannot evaluate the impact on the video quality. The subjective evaluation which is conducted by video experts, varies with individual expertise which means it is not consistent, and it is also expensive and time consuming.

The statistical evaluation involves the addition of a reference image to achieve the actual good quality video for the evaluation which is not practical, as it only gives the statistical parameters like PSNR, MSE, SSIM INDEX, Etc., but it does not provide any information on perceptual quality. The artificial neural network evaluation involves extraction of features for the evaluation which is not real time. Furthermore, the above-mentioned current solutions use very limited amount of data for the training. Therefore, there is a need for a video quality assessment system that provides a real time feedback that informs an end user regarding the perceptual quality of the video rendered on the devices of the end user.

SUMMARY OF THE INVENTION

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose to present some concepts of the subject matter in a simplified form as a prelude to the more detailed description that is presented later.

The object of the present invention is to develop a perceptual video quality assessment system that provides a real time feedback that informs the service provider, the perceptual quality of the video rendered on the devices of the end user, which eventually lead to an accurate evaluation of the real time video quality experience by the end user.

A video quality evaluation system disclosed here addresses the above-mentioned need for a video quality assessment system that provides a real time feedback that informs an end user regarding the perceptual quality of the video rendered on the devices of the end user.

The video quality evaluation system comprises a training module, a calculation module, an analytical module, a designing module, an optimization module, and an estimation module. The training module that is controlled by a processor collects training videos, wherein the training module trains labels of perceptual quality generation that is associated with the collected training videos. The calculation module determines objective metrics based on the trained labels that are associated with the collected training videos. The analytical module controlled by the processor analyses one or more scenes of the training video, wherein the analytical module correlates objective metrics associated with the analysed scenes using perceptual parameters.

The designing module designs a Convolutional Neural Network (CNN) Architecture based on data associated with the objective metrics retrieved from the correlation, wherein the training module trains a model generated based on the designed CNN architecture. The optimization module optimizes the model generated based on the designed CNN architecture, wherein a hardware optimised solution is generated for deployment at a router level, and wherein the optimization module optimizes power after the model optimization. The estimation module controlled by the processor estimates perceptual quality scores for incoming video data after the power optimization.

In an embodiment, wherein the training videos comprise multiple video codecs where different video transmission channels use different type of video encoding and decoding, and wherein the training captures degradation introduced by each of the multiple codecs to calculate the perceptual quality scores. In an embodiment, performing scene classification on the collected training videos generate content aware dataset, and wherein the content aware dataset is used for the identification of multiple classes. In an embodiment, quality parameters associated with the training of the model include one or more of: blocking, blur, freezing, flickering, Peak Signal-To-Noise Ratio (PSNR), Mean-Square Error (MSE), Structural Similarity Index Measure (SSIM), and Natural Image Quality Evaluator (NIQE).

In an embodiment, the CNN architecture is designed for higher accuracy while keeping the resource requirement minimum, which facilitates performing the video quality evaluation on low power devices while maintaining accuracy and throughput. In an embodiment, the CNN architecture is designed for higher accuracy while keeping the resource requirement minimum.

In other words, The perceptual video quality assessment system describes an adaptive video quality score (AVQS), wherein a video quality assessment metric is designed based on a proprietary CNN Architecture, which utilizes both perceptual quality and the statistical distribution of the video. The processing that is associated with the video quality assessment system is primarily at a router level, more particularly to intercept videos at router level for the analysis of perceptual quality. The perceptual video quality assessment system, therefore addresses a hardware optimised solution for deployment at the router level, which is integrated with the Universal Serial Bus (USB) interface, which provides real time solutions for limited resource platform. The perceptual video quality assessment system, performs processing at EDGE devices, for example, hardware of laptops and mobiles, where the solution demonstrated by the perceptual video quality assessment system analyses the perceptual quality of the streaming videos and the video conference/call stream.

The perceptual video quality assessment system performs power optimised solution for Edge devices, wherein the power optimised solution is designed for the Edge devices after taking into account the limitation of the battery capacity. The perceptual video quality assessment system supports multiple video codecs, wherein different video transmission channels use different type of video encoding and decoding, for example, H.264, VP8, HEVC, MPEG4, etc., and hence the solution is built to support popular codecs. The perceptual video quality assessment system generates data for content aware training, where the proprietary CNN architecture is trained with different datasets for different use cases based on the content mainly transferred in the process.

BRIEF DESCRIPTION OF DRAWINGS

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DESCRIPTION OF THE INVENTION

The present invention is directed to a perceptual video quality assessment system that provides a real time feedback that tells the service provider about perceptual quality of the video rendered on the devices of the end user, eventually leading to an accurate evaluation of the real time video quality experience by the end user.

Figure 1A:
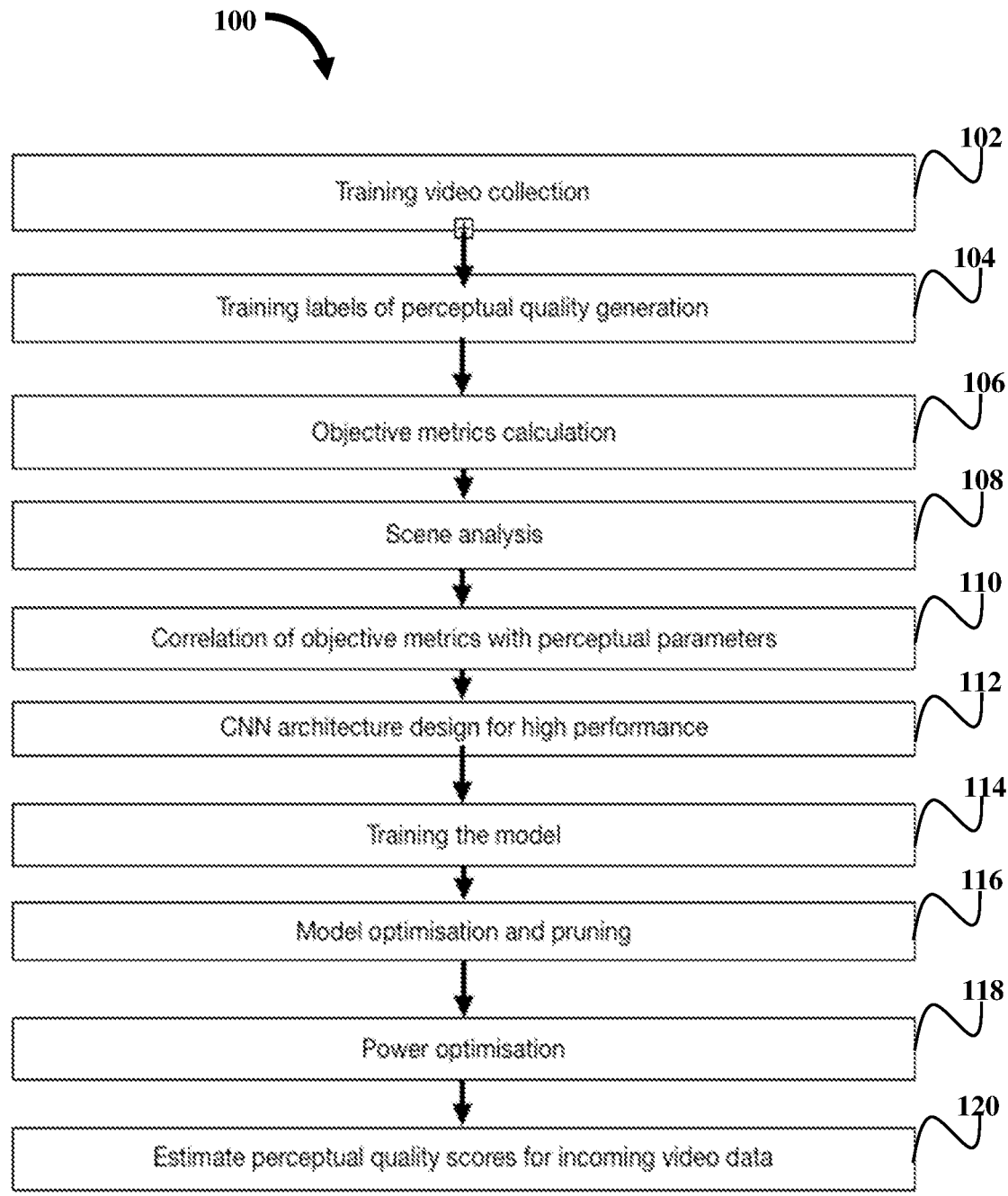
FIG. 1A shows a flow diagram of the different steps involved in the video quality evaluation system, according to an exemplary embodiment.
Figure 1B:
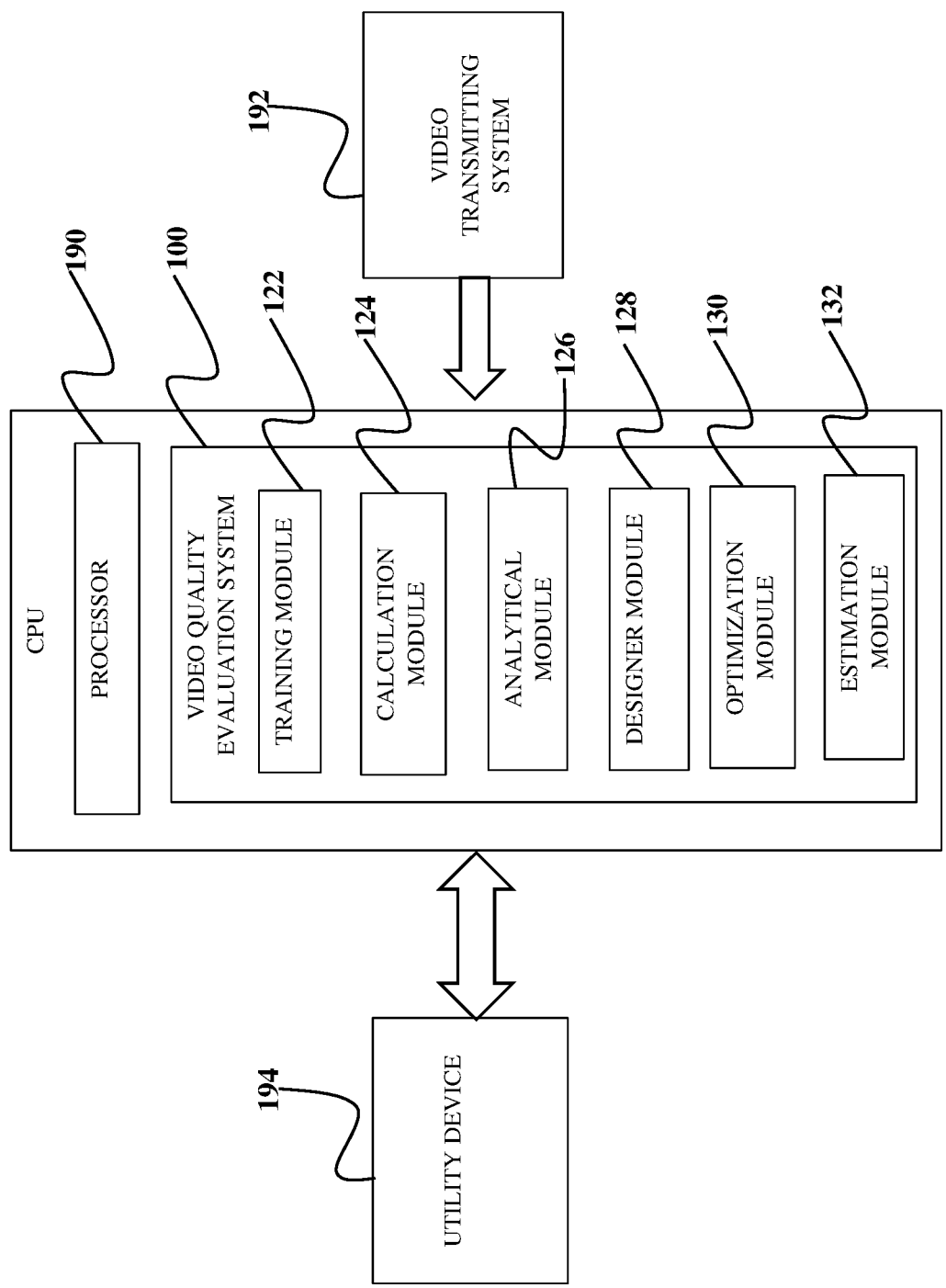
FIG. 1B shows a schematic diagram that shows the different modules involved in the video quality evaluation system, according to an exemplary embodiment.
Figure 2:
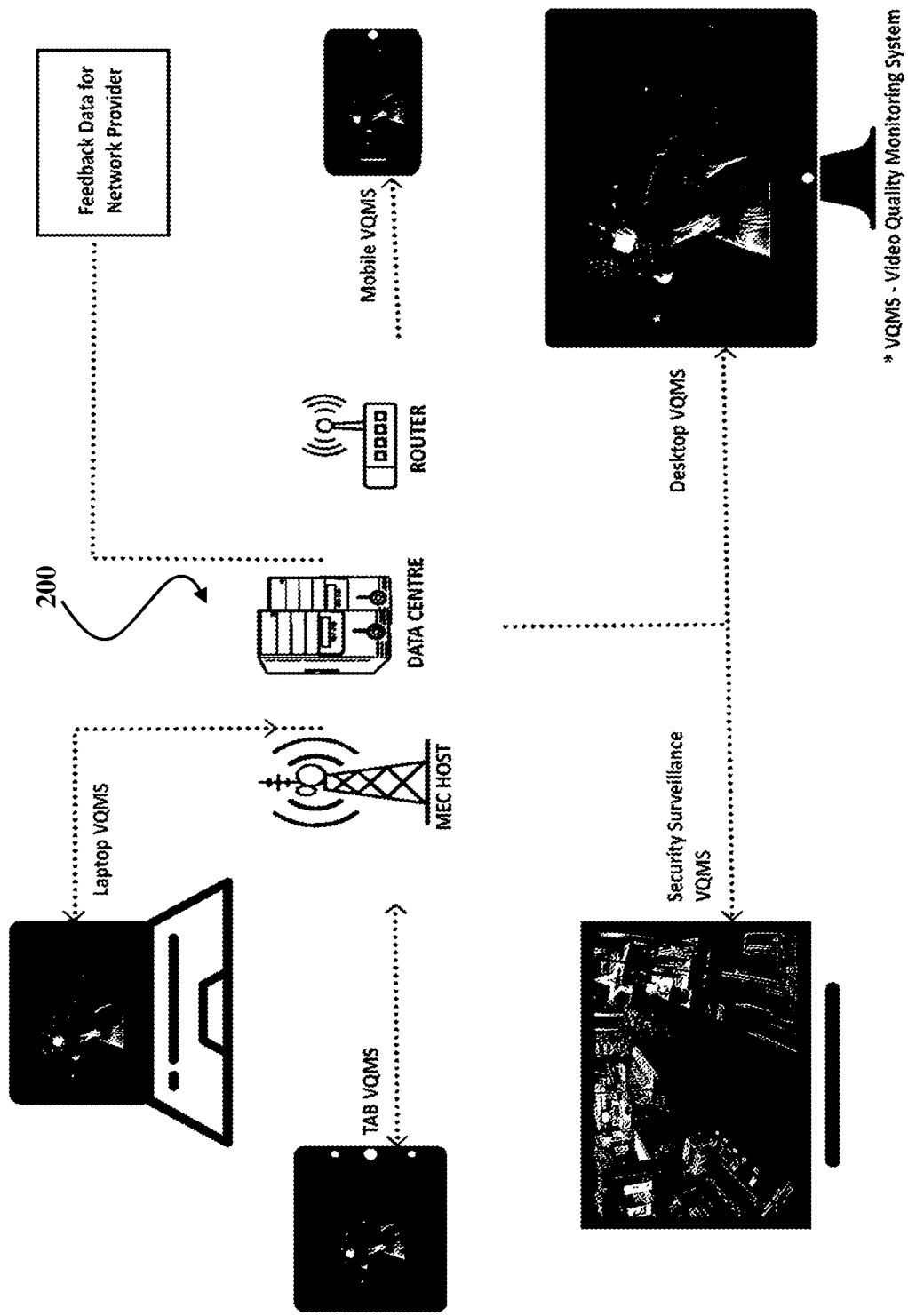
FIG. 2 shows a schematic diagram of the utilities associated with the video quality evaluation system, according to an exemplary embodiment.

FIG. 1A shows a flow diagram of the different steps involved in the video quality evaluation system 100, according to an exemplary embodiment, and FIG. 1B shows a schematic diagram that shows the different modules involved in the video quality evaluation system 100, according to an exemplary embodiment. Based on FIG. 1B, the video transmission is considered between the video transmitting system 192 and the utility device 194. The video transmitting system 192 comprises, for example, the MEC host, data centre, and the router as shown in FIG. 2. The utility devices 194 include, for example, the laptop, TAB, security surveillance, desktop, and mobile. The video quality evaluation system 100 includes modules 122-132, which are described in the detail in the following description.

The video quality evaluation system 100 is configured to intercept videos at router level for the analysis of perceptual quality. Routers are in general, designed to receive and transmit data, and processing any video analytics on the router is not possible since it has very little compute capability. In order to run the video quality evaluation system 100, multiple low power devices with moderate compute capability are evaluated, which are integrated with existing routers used by network infrastructure providers. With help of a low power compute stick, the video quality evaluation system 100 is enabled to be run on any network infrastructure.

In order to conduct a video quality evaluation, the video quality evaluation system 100 performs a collection 102 of training videos via a training module 122 controlled by processor 190 that's included in the video quality evaluation system 100 in FIG. 1B. The video quality evaluation system 100, for example, supports multiple video codecs where different video transmission channels use different type of video encoding and decoding, for example, H.264, VP8, HEVC, MPEG4, etc., and hence while creating the training dataset most of the codecs were used. Since the solution associated with the video quality evaluation system 100 is trained on major codecs, it captures the degradation introduced by them and utilizes them to calculate the perpetual quality score.

Followed by the collection 102, a step of training 104 labels of perceptual quality generation that is associated with the collected training videos is performed by the training module 202, based on which an objective metrics determination 106 is performed by a calculation module 124 controlled by processor 190, as shown in FIG. 1B. Here, where content aware training data generation is considered, the loss of data packets has different impact on different scenes that is a reason why it's necessary to include maximum possible scenario in the dataset. The concept of scene classification is utilized to generate content aware dataset, and the content aware dataset is used for the identification of 365 classes.

A scene analysis 108 is performed by an analytical module 126 controlled by the processor 190, which follows the step of objective metrics calculation 106, wherein a correlation 110 of objective metrics associated with the analysed scenes is also performed by the analytical module 126 with perceptual parameters. Based on the data retrieved from the correlation 110 procedure, a CNN architecture is designed 112 for high performance by a designer module 128 controlled by the processor 190. The model generated based on the designed 112 CNN architecture is subjected to a training 114 procedure by the training module 122, wherein the CNN architecture is designed for higher accuracy while keeping the resource requirement minimum, which helps in running the video quality evaluation system 100 on low power devices while maintaining accuracy and throughput. A step of model optimization 116 and pruning is performed by an optimization module 130 controlled by processor 190 for better results, wherein the video quality evaluation system 100 generates a hardware optimised solution for deployment at the router level. At the router level, high power processing units cannot be integrated since it will impact the network infrastructure cost by a great margin, hence low power cost effective device can only be integrated with routers to run video analysis tool at network level. Low power processing unit comes with limited compute capability, and therefore the hardware optimised network architecture is designed keeping this limitation in consideration, and is further pruned it to reduce the number of calculations.

A power optimization 118 procedure is initiated by the optimization module 130 after model optimization 116, for example, Edge devices like mobiles and laptops have limited power resources and a power consuming solution will drain out the power source in no time. In order to make video quality evaluation system 100 practical for edge devices, the model is optimised 116 as well as the execution pipeline, which eventually reduces the power consumption required. Furthermore, there is always a possibility of data loss at last mile delivery of network infrastructure that degrades the quality of experience as well as the quality of streamed video is unknown to both content and network providers. The only way to get the perceptual quality feedback is to run the video quality evaluation system 100 on the edge devices, and hence the video quality evaluation system 100 is designed keeping the limitation of edge devices in consideration.

The video quality evaluation system 100 then estimates 120 perceptual quality scores for incoming video data via an estimation module 132 controlled by the processor 100, as shown in FIG. 1B. The Adaptive video quality score (AVQS) is a quality metric that describes how good is the perceptual quality of the input video, where AVQS utilizes both objective and subjective metrics at the time of learning through CNN architecture. Objective parameters always need a reference video for their estimation which is not feasible in real time scenario and they are not always in coherence with the perceptual quality of the video. Perceptual quality is generally analysed by subjective evaluation which is not feasible when it comes to real time. The following quality parameters are considered at the time of training 114, for example, Blocking, Blur, Freezing, Flickering, peak signal-to-noise ratio (PSNR), mean-square error (MSE), structural similarity index measure (SSIM), and natural image quality evaluator (NIQE).

FIG. 2 shows a schematic diagram of the utilities associated with the video quality evaluation system 100, according to an exemplary embodiment. As shown herein, the video quality evaluation system 100 or the video quality monitoring system (VQMS) that is associated with the laptop, TAB, security surveillance, desktop, and mobile. Here the video transmitting system 194 comprising the MEC host, the data centre, and the router transmits video signals to, for example, the laptop, TAB, security surveillance, desktop, and mobile. The feedback data from the network provider is verified, based on which the video quality evaluation system 100 is operational to estimate perceptual quality scores for incoming video data, as described in the detailed description of FIGS. 1A and 1B.

The video quality evaluation system 100 improvises video broadcasting system, wherein multicast network providers receive the real time feedback on the perceptual quality of the video and evaluate the quality of the video experience by the end users, which can be used for creating the feedback system for the network providers and the content providers. The video quality evaluation system 100 works on OTT Platforms, for example, as unicast and video calling and video conferencing solution providers, where they receive the real time feedback on the perceptual quality of the video. The video quality evaluation system 100 assists telecom networks, for example, 5G Network providers can evaluate the video quality at their local data centres (MEC). The video quality evaluation system 100 assists in security and surveillance systems, wherein the video quality evaluation system 100 evaluates the video quality of the CCTV footage in real time. The video quality evaluation system 100 also assists in game streaming in rendering the gaming quality.

As will be appreciated by one of skill in the art, the present invention may be embodied as a method, system and apparatus. Accordingly, the present invention may take the form of an entirely hardware embodiment, a software embodiment or an embodiment combining software and hardware aspects.

It will be understood that each block of the block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the drawings and specification, there have been disclosed exemplary embodiments of the invention. Although specific terms are employed, they are used in a generic and descriptive sense only and not for purposes of limitation of the scope of the invention.

We claim:

1. A method for video quality evaluation:
   collecting training videos via a training module controlled by a processor;
   training, via the training module, labels of perceptual quality generation that is associated with the collected training videos;
   determining, via calculation module, objective metrics based on the trained labels that are associated with the collected training videos;
   analysing, via an analytical module controlled by the processor, one or more scenes of the training video;
   correlating, via the analytical module, objective metrics associated with the analysed scenes using perceptual parameters;
   designing, via a designing module, a Convolutional Neural Network (CNN) Architecture based on data associated with the objective metrics retrieved from the correlation;
   training, via the training module, a model generated based on the designed CNN architecture;
   optimizing, via an optimization module, the model generated based on the designed CNN architecture, wherein a hardware optimised solution is generated for deployment at a router level;
   optimizing power via the optimization module, after the model optimization; and
   estimating, via an estimation module controlled by the processor, perceptual quality scores for incoming video data after the power optimization.

2. The method as claimed in claim 1, wherein the training videos comprise multiple video codecs where different video transmission channels use different type of video encoding and decoding, and wherein the training captures degradation introduced by each of the multiple codecs to calculate the perceptual quality scores.

3. The method as claimed in claim 1, wherein performing scene classification on the collected training videos generate content aware dataset, and wherein the content aware dataset is used for the identification of multiple classes.

4. The method as claimed in claim 1, further comprising quality parameters associated with the training of the model include one or more of: blocking, blur, freezing, flickering, Peak Signal-To-Noise Ratio (PSNR), Mean-Square Error (MSE), Structural Similarity Index Measure (SSIM), and Natural Image Quality Evaluator (NIQE).

5. The method as claimed in claim 1, wherein the CNN architecture is designed for higher accuracy while keeping the resource requirement minimum, which facilitates performing the video quality evaluation on low power devices while maintaining accuracy and throughput.

6. The method as claimed in claim 5, wherein the CNN architecture is designed for higher accuracy while keeping the resource requirement minimum.

7. A video quality evaluation system comprising:
a training module that is controlled by a processor collects training videos, wherein the training module trains labels of perceptual quality generation that is associated with the collected training videos;
a calculation module determines objective metrics based on the trained labels that are associated with the collected training videos;
an analytical module controlled by the processor analyses one or more scenes of the training video, wherein the analytical module correlates objective metrics associated with the analysed scenes using perceptual parameters;
a designing module designs a Convolutional Neural Network (CNN) Architecture based on data associated with the objective metrics retrieved from the correlation, wherein the training module trains a model generated based on the designed CNN architecture;
an optimization module optimizes the model generated based on the designed CNN architecture, wherein a hardware optimised solution is generated for deployment at a router level, and wherein the optimization module optimizes power after the model optimization; and
an estimation module controlled by the processor estimates perceptual quality scores for incoming video data after the power optimization.

8. The video quality evaluation system as claimed in claim 7, wherein the training videos comprise of multiple video codecs where different video transmission channels use different type of video encoding and decoding, and wherein the training captures degradation introduced by each of the multiple codecs to calculate the perceptual quality scores.

9. The video quality evaluation system as claimed in claim 7, wherein scene classification is performed on the collected training videos to generate content aware dataset, and wherein the content aware dataset is used for the identification of multiple classes.

10. The video quality evaluation system as claimed in claim 7, further comprising quality parameters associated with the training of the model include one or more of: blocking, blur, freezing, flickering, Peak Signal-To-Noise Ratio (PSNR), Mean-Square Error (MSE), Structural Similarity Index Measure (SSIM), and Natural Image Quality Evaluator (NIQE).

* * * * *